Nov. 21, 1939.     F. SCHMIDT     2,180,613
ELASTIC MOUNTING DEVICE
Filed Dec. 13, 1937
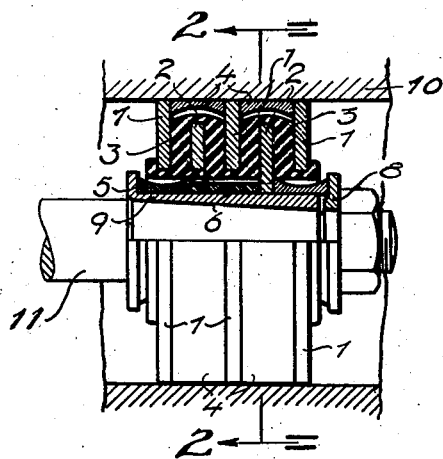
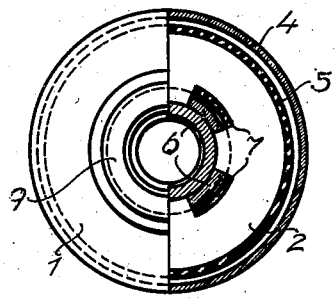
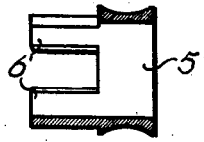
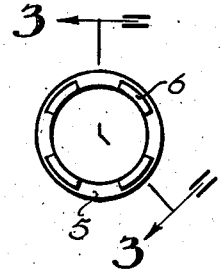
INVENTOR.
Fritz Schmidt.
BY
Harness, Dickey & Pierce.
ATTORNEYS.

Patented Nov. 21, 1939

2,180,613

UNITED STATES PATENT OFFICE 2,180,613

ELASTIC MOUNTING DEVICE

Fritz Schmidt, Harburg-Wilhelmsburg, Germany

Application December 13, 1937, Serial No. 179,625
In Germany December 14, 1936

5 Claims. (Cl. 248—358)

The invention relates to an elastic mounting element in which there are used rubber-metal parts, which are tightly connected with one another by vulcanizing or cementing in known manner. The advantage of the invention, as compared with the constructional parts made with the ordinary constructional means for similar purposes, consists in that the mounting element is by the special design and arrangement of certain separate parts given a compact spatial form, which makes it adaptable for use particularly in cases where a saving of space is important. Such a case is for example with the elastic suspension of a front engine upon an aircraft's framework. Further advantages are simplicity of the internal construction of the subject of the invention, and simplicity of its installation at the place where it is used.

An object of the invention, therefore, is the provision of an elastic mounting of the above designated general character wherein the parts are arranged compactly and the assembly may be installed in a very simple manner.

Another object of the invention is to provide a structure especially adapted for elastically suspending a front engine on an aircraft frame.

The drawing illustrates one form of construction of the invention, wherein:

Figure 1 shows in its upper half a longitudinal section in the vertical plane of symmetry, and shows a side view in its lower half;

Fig. 2 shows in its left half a front view, and shows in its right half a longitudinal section along the line 2—2 of Fig. 1;

Fig. 3 shows the broken longitudinal section of a single part along the line 3—3 of Fig. 4; and Fig. 4 shows a front view of the single part or detail.

The form and use of the rubber-metal parts in the present case are of themselves generally known. The metal parts are disks 1 and 2 of different inner and outer diameters, which alternate relatively to one another in their position in the mounting element. Rubber 3 between the disks 1 and 2 is tightly vulcanized or tightly cemented to the metal disks in a way that is likewise known. In the resulting rubber-metal part the large disks 1 are maintained at a suitable spacing from one another by outer divided spacing rings 4, and both are pressed together during installation into the hole in the machine frame or the like that serves to receive them in a press fitting manner.

The invention relates to the connection of the inner disks 2 with one another and with the pin by means of which the engine that is to be supported engages in the rubber-metal part. It would be difficult or inconvenient to use spacing rings similar to the rings 4 also for establishing the mutual spacing of the disks 2, because they are inserted in a number of parts from the side of the hole, and have to be assembled permanently on the spot. In order to eliminate this difficulty, the spacing ring 5 is given the shape that may be seen from Figs. 3 and 4. According to these figures, it consists of the closed head part 5 and the extension 6, which is connected to it and is cut out claw-fashion. By the aid of this latter, two of these spacing rings with the extensions 6 may be pushed into one another so that they form a closed cylinder for the greater part of their length. In order to make it possible to use the spacing rings 5, 6 for the purpose under consideration, the disks 2 are provided in their holes with cut-outs 7, through which the claws 6 of the spacing rings 5 may be pushed axially in such wise that twisting relatively to one another is impossible. In the radial direction, on the other hand, the cut-outs 7 are larger than is required for the thickness of the claws 6, in order on the one hand to make clearance for the introduction of the rings 5, 6, and on the other hand in order to make it possible to be able to carry the rubber 3 past the inner edges of the disks 2 for the purpose of damping noises, as is also the case with respect to the disks 1.

The assembly of the mounting element with the machine frame or the like as a foundation on the one hand, and on the other hand with the machine that is to be mounted therein, is effected in such wise that in the first place the provided number of mounting elements, which comprises all parts except the washer 8, are inserted into the hole provided for their reception in the frame 10 of the machine, a flying machine for example, and are so fastened that the disks 1 are clamped tightly and immovably with the spacing rings 4. After this, the machine, an airplane front engine say, is inserted, by means of the conical mounting pins or studs 11 that are fastened to it, into the suitably shaped sleeve 9 of the mounting element (from the left in Fig. 1), after which the washers 8 are put on, and the attaching nuts are screwed on to the threads cut on the mounting pins or studs.

The manner in which the subject of the invention works is that the rotary vibrations and the radially directed vibrations are taken in a gentle elastic manner, because with these vibrations a shearing stress occurs in the rubber mass 3, against which stress the rubber offers less resistance than to tension and compression.

Because stresses of the last-named type occur with shocks and vibrations in an axial direction, these vibrations are in accordance with the idea damped in a stiff elastic manner. This natural relationship of the different damping actions may moreover be adapted to the individual case under consideration by suitable alterations in the rubber's dimensions in the three planes of coordinates, and in addition to this by selection from various hardnesses of rubber.

What is claimed is:

1. An elastic mounting for resiliently supporting one member on another, comprising axially spaced discs, rubber between the discs, an element having a part engaging the axially outer side of each disc and having a part projecting through an opening in the disc and into abutting relation with the other disc, means for holding the elements together axially of the discs and for mounting them on one of said members, and means supporting the rubber and adapted to engage the other of said members.

2. An elastic mounting comprising spaced discs each having a central opening provided with circumferentially spaced axial recesses in the edge defining the opening, with the recesses in each disc aligned axially with the edge portions between recesses in the other disc, rubber between the discs, inner disc spacing means comprising a cylindrical element abutting the axially outer side of each disc and having axial legs passing through the recesses in such disc and into abutting engagement with the other disc, means for holding the cylindrical elements and discs on one member, and means supporting the rubber and adapted to engage the other member.

3. An elastic mounting comprising a pair of first spaced discs each having a central opening provided with circumferentially spaced axial recesses in the edge defining the opening with the recesses in each disc aligned axially with the edge portions between recesses in the other disc, second discs disposed in axially spaced relation to the first discs and having central openings, means between the radially outer parts of the second discs for holding them in separated relation, a cylindrical member abutting the axially outer side of each of the first discs and having axial legs passing through the recesses therein and into abutting relation with the other of said first discs, and rubber between the discs.

4. An elastic mounting comprising a pair of first spaced discs each having a central opening provided with circumferentially spaced axial recesses in the edge defining the opening with the recesses in each disc aligned axially with the edge portions between recesses in the other disc, second discs disposed in axially spaced relation to the first discs and having central openings, means between the radially outer parts of the second discs for holding them in separated relation, a cylindrical member abutting the axially outer side of each of the first discs and having axial legs passing through the recesses therein and into abutting relation with the other of said first discs, and rubber between the discs, said recesses being radially larger than the legs to provide space along the outer side of the latter, and the rubber extending through such space.

5. An elastic mounting comprising inner and outer members, a series of axially spaced discs between the members and which have central apertures through which the inner member extends, one pair of said discs having circumferentially separated recesses in their radially inner edges with the recesses in one disc aligned axially with the portions between recesses of the other disc, a cylindrical element abutting the axially outer side of each disc of said pair and having legs projecting axially through the recesses therein and into engagement with the inner side of the other disc of said pair, rubber between all of the discs, means mounting the cylindrical elements on the inner member, and means mounting the other discs on the outer member, the radial dimensions of the discs being such that said pair of discs may move radially a limited amount relative to the other discs so as to permit like relative movement of the inner and outer members.

FRITZ SCHMIDT.